(12) United States Patent
Zhao

(10) Patent No.: US 11,985,191 B2
(45) Date of Patent: May 14, 2024

(54) APPLICATION SYNCHRONIZATION METHOD

(71) Applicant: BEIJING XIAOMI MOBILE SOFTWARE CO., LTD., Beijing (CN)

(72) Inventor: Linger Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/955,464

(22) Filed: Sep. 28, 2022

(65) Prior Publication Data

US 2023/0139035 A1 May 4, 2023

(30) Foreign Application Priority Data

Oct. 29, 2021 (CN) .......................... 202111273228.4

(51) Int. Cl.
*H04L 67/1095* (2022.01)
*G06F 3/0481* (2022.01)

(52) U.S. Cl.
CPC ........ *H04L 67/1095* (2013.01); *G06F 3/0481* (2013.01)

(58) Field of Classification Search
CPC .......................... H04L 67/1095; G06F 3/0481
USPC ....................................................... 709/223
See application file for complete search history.

(56) References Cited

U.S. PATENT DOCUMENTS

| 9,003,299 B2* | 4/2015 | Freedman ............... H01B 7/292 |
| | | 715/745 |
| 9,804,731 B1* | 10/2017 | Baloga ................ G06F 3/04847 |
| 11,270,264 B1* | 3/2022 | Casale .................. H04L 65/403 |
| 2005/0138122 A1* | 6/2005 | Boehringer ........... G06Q 10/10 |
| | | 709/205 |
| 2011/0045873 A1* | 2/2011 | Jeffrey .................... H04L 67/04 |
| | | 455/557 |
| 2014/0101572 A1* | 4/2014 | Gunderson ........... G06F 3/0481 |
| | | 715/758 |
| 2016/0088480 A1* | 3/2016 | Chen ........................ H04L 67/34 |
| | | 709/229 |
| 2016/0212209 A1* | 7/2016 | Qian ...................... H04L 67/141 |
| 2017/0034264 A1* | 2/2017 | Yang .................. H04L 67/1095 |
| 2017/0230481 A1 | 8/2017 | Wu |
| 2022/0286503 A1* | 9/2022 | Luo ......................... H04W 4/80 |

FOREIGN PATENT DOCUMENTS

| EP | 2648427 A1 * | 10/2013 | ............... H04B 1/40 |
| WO | 2021104230 A1 | 6/2021 | |

OTHER PUBLICATIONS

Extended European Search Report of EP Application No. 22198494.1 dated Mar. 17, 2023, (12p).

* cited by examiner

*Primary Examiner* — Ruolei Zong
(74) *Attorney, Agent, or Firm* — Arch & Lake LLP

(57) ABSTRACT

An application synchronization method is provided. The method includes acquiring an application identification and running status data of a currently running target application, and sending the application identification and the running status data to a second terminal associated with the first terminal to synchronize the target application on the second terminal with the target application on the first terminal.

12 Claims, 6 Drawing Sheets receiving an application identification and running status data of a target application sent by a first terminal associated with the second terminal, in which the target application is an application currently running on the first terminal — S401 displaying an icon of the target application in a target display area of the second terminal according to the application identification of the target application — S402 starting the target application and running the target application according to the running status data in response to monitoring a start instruction to start the target application — S403 step 1:
read a note on
a mobile phone step 2: click an icon on a tablet relay the note on the mobile phone
to the tablet for reading

APPLICATION SYNCHRONIZATION METHOD

CROSS-REFERENCE TO RELATED APPLICATION

The present application is based upon and claims priority to Chinese Patent Application No. 202111273228.4 filed on Oct. 29, 2021, the entire content of which is incorporated herein by reference for all purposes.

FIELD

The present disclosure relates to the field of communication technology, and more particularly, to an application synchronization method, an application synchronization apparatus, an electronic device, and a storage medium.

BACKGROUND

In the related technology, if a user wants to switch a running application from terminal A to terminal B, he/she needs to open the terminal B and find respective application first, and then start the application to search for relevant resources and locate running progress by itself. This process needs multi-layer interaction between the user and the terminals, and the efficiency of cooperation between terminals is low. Therefore, how to improve the efficiency of cooperation between the terminals and realize seamless relay use of applications between two devices has become one of the important research directions.

SUMMARY

According to a first aspect of the present disclosure, there is provided an application synchronization method, applied to a first terminal, the method including: acquiring an application identification and running status data of a currently running target application; and sending the application identification and the running status data to a second terminal associated with the first terminal to synchronize the target application on the second terminal with the target application on the first terminal.

According to a second aspect of the present disclosure, there is provided application synchronization method, applied to a second terminal, the method including: receiving an application identification and running status data of a target application sent by a first terminal associated with the second terminal, in which the target application is an application currently running on the first terminal; displaying an icon of the target application in a target display area of the second terminal according to the application identification of the target application; and starting the target application and running the target application according to the running status data in response to monitoring a start instruction to start the target application.

According to a third aspect of the present disclosure, there is provided an electronic device, including a processor; and a memory for storing an executable program code. The processor is configured to run a program corresponding to the executable program code by reading the executable program code to implement the application synchronization method according to the first or second aspects of the present disclosure.

It can be understood that what is described in this section is not intended to identify key or critical features of embodiments of the present disclosure, nor is it intended to limit the scope of the present disclosure. Other features of the present disclosure will be readily understood from the following description.

DETAILED DESCRIPTION

Figure 1:
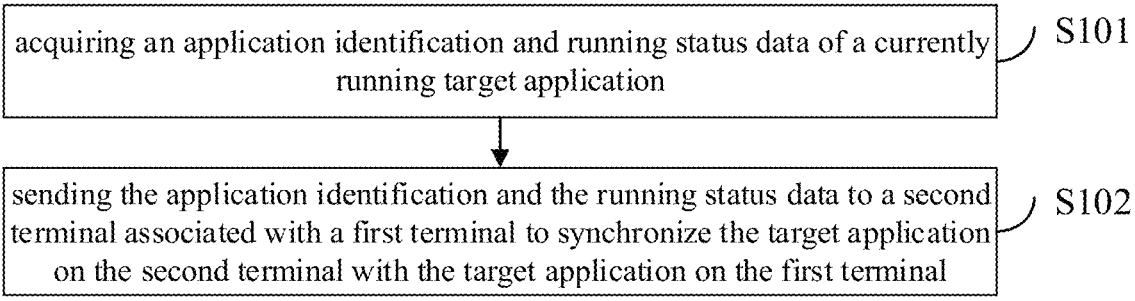
FIG. 1 is a flow chart of an application synchronization method according to an embodiment of the present disclosure.

Embodiments of the present disclosure are described in detail below, examples of which are illustrated in the accompanying drawings. The same or similar reference numerals represent the same or similar elements or elements having the same or similar functions throughout the descriptions. The embodiments described below with reference to the accompanying drawings are illustrative, and are intended to explain the present disclosure and cannot be construed as limiting the present disclosure.

An application synchronization method, an application synchronization apparatus, an electronic device, and a storage medium according to embodiments of the present disclosure are described below with reference to the accompanying drawings.

FIG. 1 is a flow chart of an application synchronization method according to an embodiment of the present disclosure. As shown in FIG. 1, the application synchronization method is applied to a first terminal. For example, the first terminal may be a personal computer (PC), a handheld computer, a cloud TV, a mobile phone, or a tablet computer. The method includes the following steps.

In step S101, an application identification and running status data of a currently running target application are acquired.

Background data of the first terminal is acquired, the currently running target application is obtained according to the background data, and the application identification and the running status data of the target application are acquired. In the implementation, each application has its own application identification, which can uniquely identify the application. The first terminal can acquire an application identification of the currently running application through a function, and then can identify the application currently running on the terminal according to the application identification. In this disclosure, the application currently running on the first terminal is referred to as the target application.

For example, the target application can be one of a video playing software, a note application, an email application, a Word application, and a browser. This is merely illustrative, and cannot be construed as limiting the present disclosure.

During the running process of the target application, the first terminal can monitor the running status data of the application, and the running status data can be used to reflect the current running status of the target application. For example, the running status data includes a resource identification and a resource display progress of a target resource currently displayed by the target application. Alternatively, the running status data may also include one or more of a start moment and a running duration of the target application. This is merely illustrative, and cannot be construed as limiting the present disclosure.

In some implementations, the target application may be a video playing software, the target resource is a video being played, and the resource display progress is the progress of the video playing.

In other implementations, the target application may be a note application, the target resource is a note being viewed and edited, and the resource display progress is the viewing and editing progress of the note.

In other implementations, the target application can be an email application, the target resource is an email being read or edited, and the resource display progress is the reading or editing progress of the email.

In other implementations, the target application can be a Word application, the target resource is a Word file being read or edited, and the resource display progress is the reading or editing progress of the Word file.

In other implementations, the target application may be a browser, the target resource is a web page being browsed, and the resource display progress is the browsing progress of the web page.

In step S102, the application identification and the running status data are sent to a second terminal associated with the first terminal to synchronize the target application on the second terminal with the target application on the first terminal.

For example, the second terminal can be a PC, a handheld computer, a cloud TV, a mobile phone or a tablet computer.

In an embodiment, the first terminal is a mobile phone and the second terminal is a tablet computer. In another embodiment, the first terminal is a tablet computer and the second terminal is a mobile phone. That is, the first terminal and the second terminal can be two terminals of different types. Alternatively, the first terminal is a mobile phone and the second terminal is another mobile phone, that is, the first terminal and the second terminal can also be two terminals of the same type.

In order to achieve application synchronization, the first terminal needs to be associated with the second terminal. In the case where the first terminal can communicate with the second terminal, the first terminal can send the application identification and the running status data of the currently running target application to the second terminal through a communication connection between them. Since the second terminal is associated with the first terminal, the second terminal can receive the application identification and the running status data. Furthermore, the application on the second terminal can be synchronized with the application on the first terminal according to the received information when a trigger condition is satisfied.

In some implementations, the trigger condition may be a condition where the second terminal is lit up and performs a specific operation, which is used to indicate application synchronization, such as a specific gesture, a specific expression or voice, etc. In some implementations, the trigger condition may be a condition where the target application on the second terminal is triggered. Accordingly, after receiving the application identification and the running status data, the second terminal invokes a local target application according to the application identification, starts the application, and finds the target resource from a local server or a resource server according to the running status data and locates it to the current display progress.

In some implementations, the first terminal may actively send the application identification and the running status data to the second terminal in real time or periodically. In other implementations, the first terminal may also send the application identification and the running status data to the second terminal after receiving a request from the second terminal.

In an embodiment of the present disclosure, the application identification and the running status data of the currently running target application are acquired. The application identification and the running status data are sent to the second terminal associated with the first terminal to synchronize the target application on the second terminal with the target application on the first terminal. In the embodiment of the present disclosure, since the first terminal can feed back the target application and its status to the second terminal, it is possible to provide a basis for realizing the application synchronization between two different terminals, and enable the second terminal to receive information to complete synchronization, thus realizing seamless relay use of applications between the two terminals, and greatly improving the efficiency and experience of the user.

Figure 2:
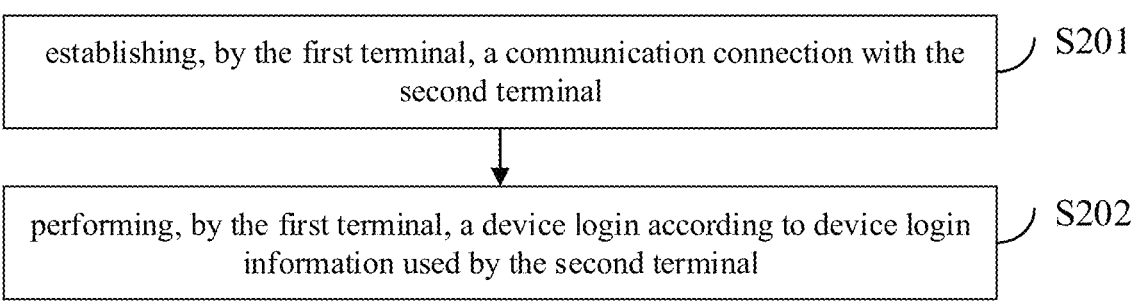
FIG. 2 is a flow chart of an application synchronization method according to an embodiment of the present disclosure.

FIG. 2 is a flow chart of an application synchronization method according to an embodiment of the present disclosure. On the basis of the above embodiment, before sending the application identification and the running status data to the second terminal associated with the first terminal, as shown in FIG. 2, the method further includes the following steps.

In step S201, a communication connection is established with the second terminal.

For example, a near-distance communication between the two terminals can be implemented through Bluetooth, WiFi, infrared data association (IrDA), near-field communication (NFC), etc.

Taking Bluetooth as an example for illustration, when the communication connection is established through Bluetooth, firstly, the first terminal starts to query surrounding devices, and the second terminal can be in a query scanning status at this time. After receiving query information sent by the first terminal, the second terminal enters a query response status and returns its own Bluetooth identification at the same time. The device address of the second terminal can be identified through the Bluetooth identification. After identifying the Bluetooth identification, the first terminal calls the second terminal, and after the second terminal responds to the call, the first terminal sends its own Bluetooth identification to the second terminal to establish a two-way communication connection for data interaction.

In step S202, a device login is performed according to device login information used by the second terminal.

The first terminal performs a login according to a device login account used by the second terminal and realizes association based on the same device login account, which can be the user's mobile phone number, email address or user name. When the first terminal and the second terminal of the user both have enabled Bluetooth or other communications and logged into the same account, the two devices will be connected automatically.

In the embodiment of the present disclosure, the first terminal establishes the communication connection with the second terminal and performs the device login according to the device login information used by the second terminal. In the embodiment of the present disclosure, it is possible to establish a communication link between the first terminal and the second terminal, and provide a transmission channel for the subsequent sending of the application identification and the running status data.

Figure 3:
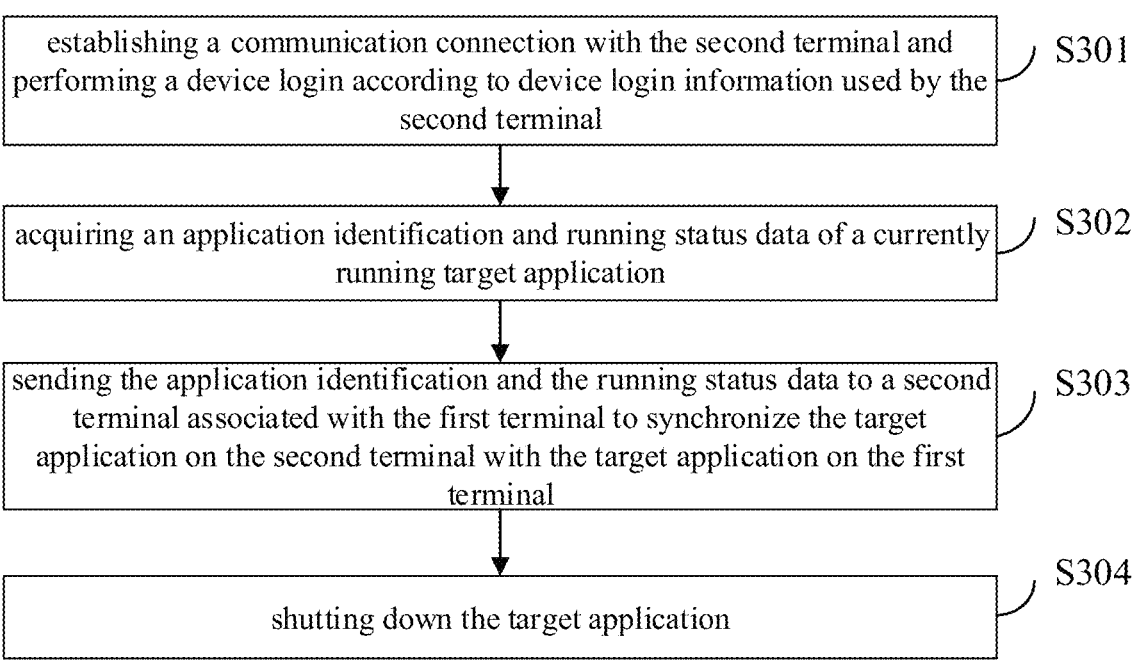
FIG. 3 is a flow chart of an application synchronization method according to an embodiment of the present disclosure.

FIG. 3 is a flow chart of an application synchronization method according to an embodiment of the present disclosure. As shown in FIG. 3, on the basis of the application synchronization method provided by the present disclosure, the synchronization process of a first terminal in a practical application scenario includes the following steps.

In step S301, a communication connection is established with the second terminal and a device login is performed according to device login information used by the second terminal.

In step S302, an application identification and running status data of a currently running target application are acquired.

In step S303, the application identification and the running status data are sent to a second terminal associated with the first terminal to synchronize the target application on the second terminal with the target application on the first terminal.

For the specific implementation of steps S301 to S303, reference can be made to the relevant introduction in each embodiment of the present disclosure, which will not be elaborated herein.

In step S304, the target application is shut down.

In an implementation, the first terminal shuts down the target application after the application synchronization is successful, which can not only restore the use freedom of the first terminal, but also reduce the energy consumption of the first terminal. Alternatively, the first terminal can inquiry the user whether the application needs to be shut down before shutting down the target application, and if yes, the target application is shut down, and if no, the target application continues running.

After sending the application identification and the running status data, the first terminal may wait for a preset period of time and then shut down the target application. The preset period of time can be determined and adjusted according to sending time of the data and a response period of time of the second terminal. Alternatively, the first terminal starts a timer after sending the target application and the status, the timer is set to the preset period of time, and the target application is shut down after the countdown of the timer ends.

Alternatively, the first terminal shuts down the target application after receiving a shutdown indication fed back by the second terminal. Monitoring that the target application is started on the second terminal indicates that the application synchronization is successful, and the second terminal sends a feedback message to the first terminal, in which the feedback message can notify the first terminal that the information transmission is completed. The first terminal can shut down the target application after monitoring the feedback message.

In some implementations, after the first terminal invokes its own target application at the second terminal, the second terminal can stop a local target application and display a synchronization indication indicating that the target application has been synchronized to the second terminal.

In the embodiment of the present disclosure, the first terminal establishes the communication connection with the second terminal and performs the device login according to the device login information used by the second terminal. The application identification and the running status data of a currently running target application are acquired and sent to the second terminal associated with the first terminal to synchronize the target application on the second terminal with the target application on the first terminal. The first terminal can shut down the target application after the application synchronization is successful. In this embodiment of the present disclosure, by shutting down the application after ensuring that the second terminal has been successfully synchronized, it is possible to not only save energy consumption of the first terminal, but also restore the use freedom of the first terminal, which can enhance user experience.

Figure 4:
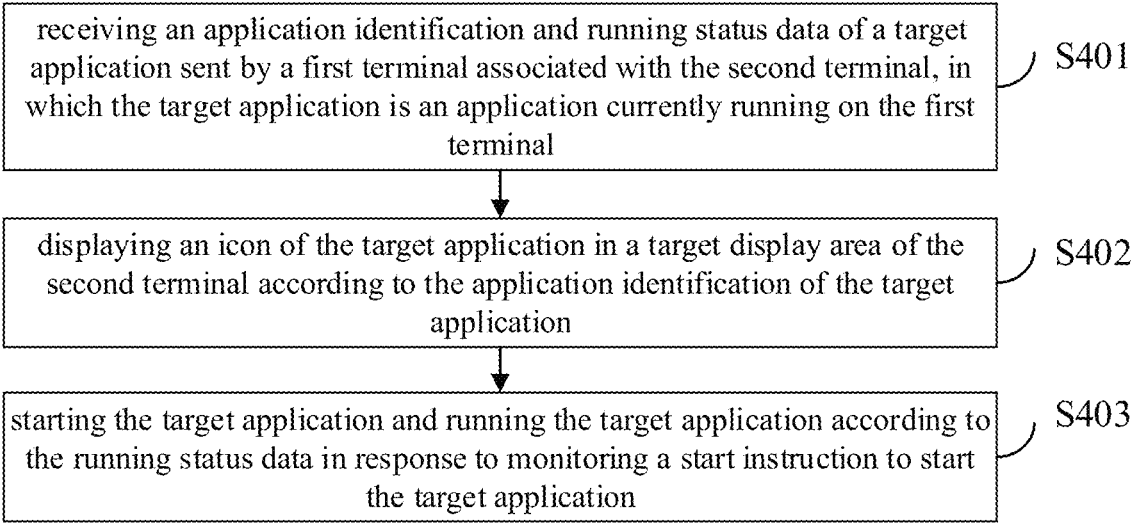
FIG. 4 is a flow chart of an application synchronization method according to an embodiment of the present disclosure.

FIG. 4 is a flow chart of an application synchronization method according to an embodiment of the present disclosure. As shown in FIG. 4, the application synchronization method is applied to a second terminal, and the method includes the following steps.

In step S401, an application identification and running status data of a target application sent by a first terminal associated with the second terminal are received, in which the target application is an application currently running on the first terminal.

The second terminal receives the application identification and the running status data of the target application sent by the first terminal through Bluetooth, in which the target application is the application currently running on the first terminal.

In step S402, an icon of the target application is displayed in a target display area of the second terminal according to the application identification of the target application.

The second terminal acquires the application identification of the target application, identifies the application identification to confirm the target application, and displays the icon of the target application in the target display area.

Figure 5:
FIG. 5 is a schematic diagram illustrating a target display area of a target application on a second terminal.
Figure 6:
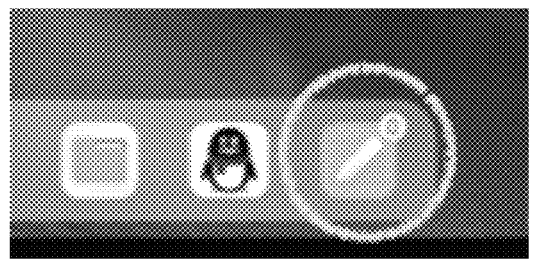
FIG. 6 is a schematic diagram illustrating an application identification of a target application that can be synchronized.

As shown in FIG. 5, for example, the target display area can be a shortcut tool (Dock) bar at a bottom of a tablet. In an embodiment, the target display area may be displayed on a display surface of the tablet in the form of a buoy. In another embodiment, the target display area can also be another area, such as an upper left corner, or a non-Dock bar area is specially arranged as the target display area. Alternatively, in an upper right corner of an icon shown in FIG. 6, there is a small logo of a device to which the first terminal belongs, indicating that the application is running on the first terminal.

In step S403, the target application is started and run according to the running status data in response to monitoring a start instruction to start the target application.

The second terminal monitors the start instruction of the target application in the target display area, starts the target application and locates a resource display progress of a target resource according to the running state data to realize seamless relay use of the application.

For example, the start instruction can be in the form of a contact, a gesture or a voice. The user can set an exclusive gesture to start the target application on the second terminal, or use voice recognition to start the target application. The target application is started when the second terminal identifies a keyword "synchronize target application."

In an embodiment of the present disclosure, the second terminal receives the application identification and the running status data of the target application sent by the first terminal associated with the second terminal, in which the target application is the application currently running on the first terminal. The icon of the target application is displayed in the target display area of the second terminal according to the application identification of the target application, and the target application is started and the target application is run according to the running status data in response to monitoring the start instruction to start the target application. In the embodiment of the present disclosure, the second terminal receives the application identification and the running status data of the target application, starts the target application and locates the resource display progress, thus realizing seamless relay use of applications between the two devices, and greatly improving the efficiency and experience of user.

Figure 7:
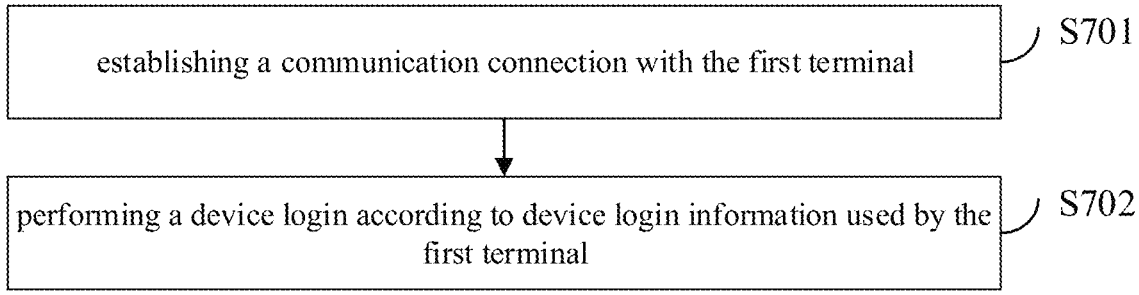
FIG. 7 is a flow chart of an application synchronization method according to an embodiment of the present disclosure.

FIG. 7 is a flow chart of an application synchronization method according to an embodiment of the present disclosure. On the basis of the above embodiment, before receiving the application identification and the running status data of the target application sent by the first terminal associated with the second terminal, as shown in FIG. 7, the method further includes the following steps.

In step S701, a communication connection is established with the first terminal.

In step S702, a device login is performed according to device login information used by the first terminal.

For the specific implementation of the present embodiment, reference may be made to the relevant introduction of the embodiment shown in FIG. 2, which will not be elaborated herein.

Figure 8:
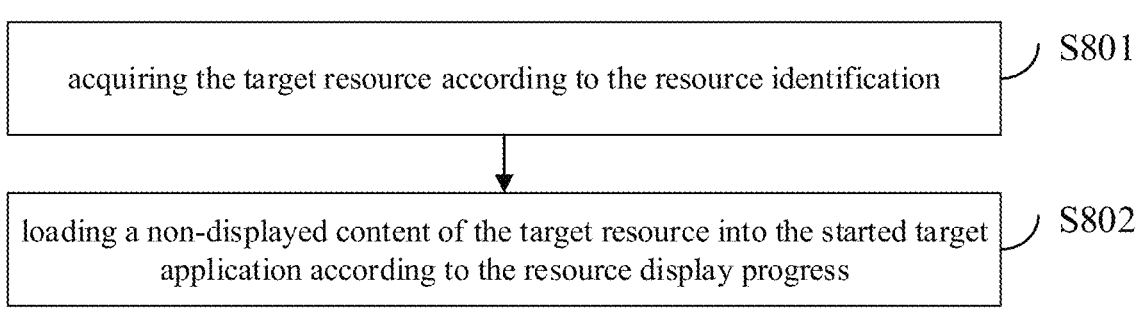
FIG. 8 is a flow chart of an application synchronization method according to an embodiment of the present disclosure.

FIG. 8 is a flow chart of an application synchronization method according to an embodiment of the present disclosure. On the basis of the above embodiment, further in conjunction with FIG. 8, the running steps according to the running status data are explained and described. The method includes the following steps.

In step S801, a target resource is acquired according to a resource identification.

Each resource is provided with a corresponding resource identification. The desired target resource is identified according to the resource identification, and it is determined whether the target resource is stored on the second terminal.

As a possible implementation, in response to the target resource being not stored on the second terminal, a request is sent to a resource server according to the resource identification and the target resource fed back by the resource server is received.

As another possible implementation, in response to the target resource being stored on the second terminal, the target resource is extracted from a local resource pool.

The second terminal queries a resource pool storage list based on the resource identification. If such an identification does not exist in the list, it indicates that the target resource is not stored on the second terminal. The second terminal sends a request to the resource server according to the resource identification and receives the target resource fed back by the resource server. If such an identification exists in the list, it indicates that the target resource is stored on the second terminal and the target resource can be extracted from the local resource pool.

In step S802, a non-displayed content of the target resource is loaded into the started target application according to the resource display progress.

As a possible implementation, a display succession position of the target resource is determined according to a resource volume of the target resource and the resource display progress. The non-displayed content of the target resource is loaded into the started target application from the display succession position. For example, when the resource volume of the target resource is 100 and the resource display progress is 20%, the display succession position of the target resource is the 20th resource position, and the subsequent non-displayed content is loaded from the 21st resource position.

As another possible implementation, the non-displayed content of the target resource is loaded into the started target application from a next moment of a current display moment, in response to the resource display progress being the current display moment. For example, when the resource display progress is the 20th minute of video playing, the subsequent non-displayed content of the video is loaded from the 21st minute.

In an embodiment of the present disclosure, the second terminal acquires the target resource according to the resource identification, and loads the non-displayed content of the target resource into the started target application according to the resource display progress. In an embodiment of the present disclosure, the second terminal acquires the target resource and locates the resource display progress to load the non-displayed content, which not only synchronizes the application with the resource, but also continues the subsequent content from the display progress, which truly realizes the seamless relay use of the application and improves the user experience.

Figure 9:
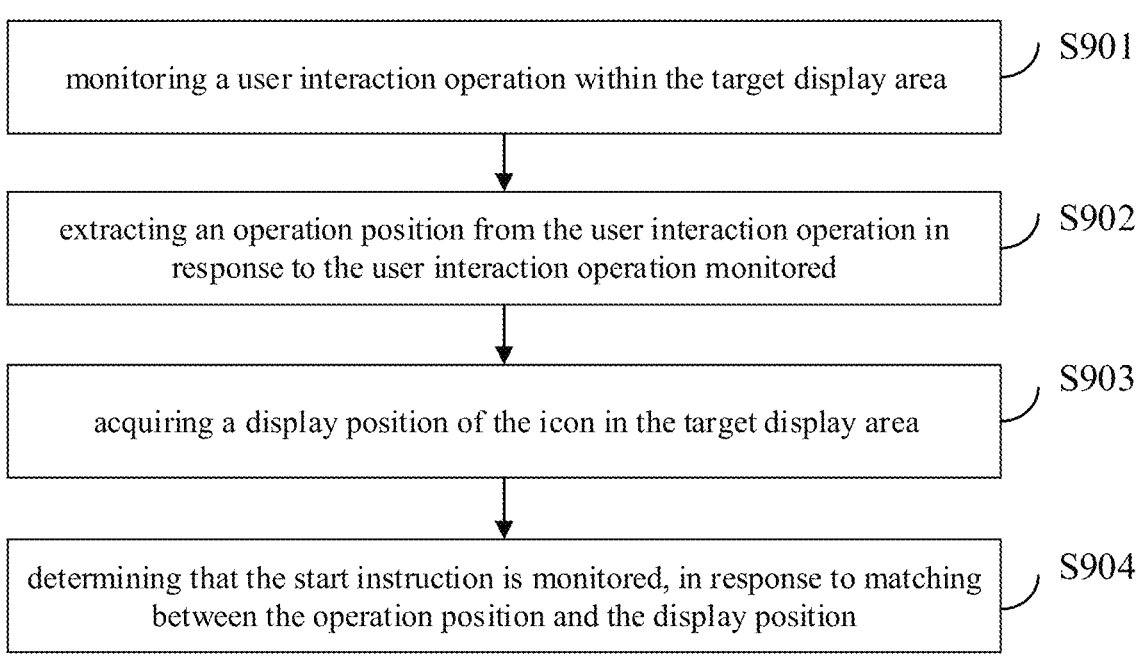
FIG. 9 is a flow chart of an application synchronization method according to an embodiment of the present disclosure.

FIG. 9 is a flow chart of an application synchronization method according to an embodiment of the present disclosure. As shown in FIG. 9, the application synchronization method is applied to the second terminal, and the method includes the following steps.

In step S901, a user interaction operation within the target display area is monitored.

When both terminals have enabled Bluetooth and logged into a same account, two devices will be automatically connected, and the icon of the application being used by the first terminal will be displayed in the target display area of the second terminal to monitor the user interaction operation in the target display area.

In step S902, an operation position is extracted from the user interaction operation in response to the user interaction operation monitored.

It is monitored that the user has performed the interaction operation in the target display area, and the operation position of the user is identified through a touch component of the device, extracted, and represented by a coordinate matrix.

In step S903, a display position of the icon in the target display area is acquired.

The display position of the icon in the target display area is identified, extracted, and represented by a coordinate matrix.

In step S904, it is determined that the start instruction is monitored, in response to matching between the operation position and the display position.

If the coordinate matrix of the operation position is within the coordinate matrix of the display position, it indicates that the operation position matches the display position, and it is determined that the start instruction is monitored.

In the embodiment of the present disclosure, the second terminal monitors the user interaction operation within the target display area, the operation position is extracted from the user interaction operation in response to the user interaction operation monitored, the display position of the icon in the target display area is acquired, and it is determined that the start instruction is monitored in response to matching between the operation position and the display position. In the embodiment of the present disclosure, it is determined whether the user wants to start application synchronization according to the operation position and the display position, which improves the processing efficiency of the device and lays a foundation for subsequent synchronization.

Figure 10:
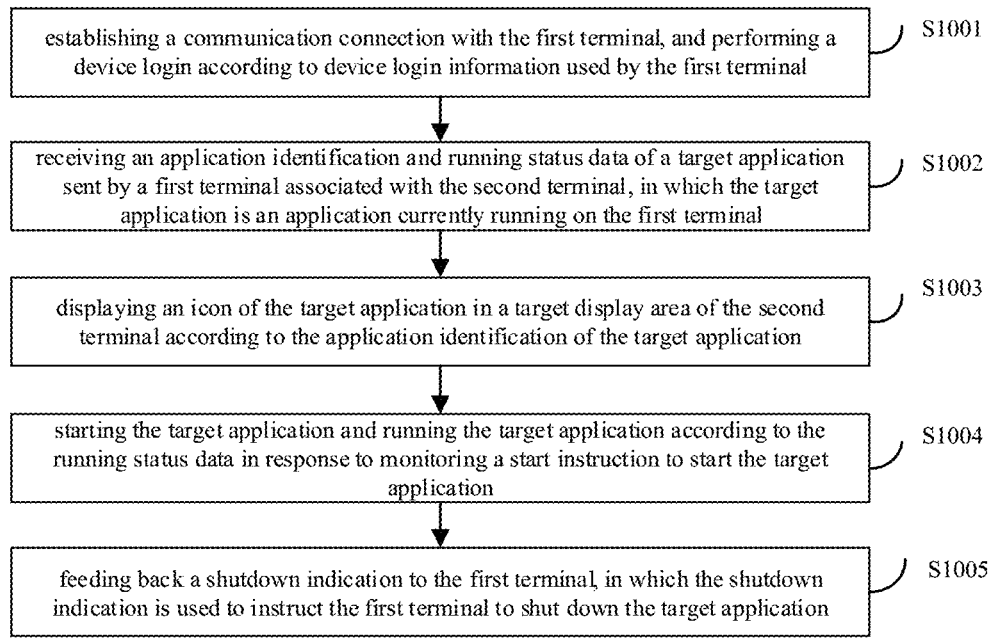
FIG. 10 is a flow chart of an application synchronization method according to an embodiment of the present disclosure.

FIG. 10 is a flow chart of an application synchronization method according to an embodiment of the present disclosure. As shown in FIG. 10, based on the application synchronization method provided in the present disclosure, the synchronization process of the second terminal in a practical application scenario includes the following steps.

In step S1001, a communication connection is established with the first terminal, and a device login is performed according to device login information used by the first terminal.

In step S1002, an application identification and running status data of a target application sent by a first terminal associated with the second terminal are received, in which the target application is an application currently running on the first terminal.

In step S1003, an icon of the target application is displayed in a target display area of the second terminal according to the application identification of the target application.

In step S1004, the target application is started and run according to the running status data in response to monitoring a start instruction to start the target application.

For the specific implementation of steps S1001 to S1004, reference may be made to the relevant introduction in each embodiment of the present disclosure, which will not be elaborated herein.

In step S1005, a shutdown indication is fed back to the first terminal, in which the shutdown indication is used to instruct the first terminal to shut down the target application.

The second terminal feeds back the shutdown indication to the first terminal, which indicates that the application on the second terminal has been successfully synchronized, and instructs the first terminal to shut down the target application and resume free use.

In the following, the application synchronization between terminals provided by embodiments of the present disclosure is explained by taking the first terminal being a mobile phone and the second terminal being a tablet computer (PAD) as an example in combination with actual application scenarios.

Figure 11:
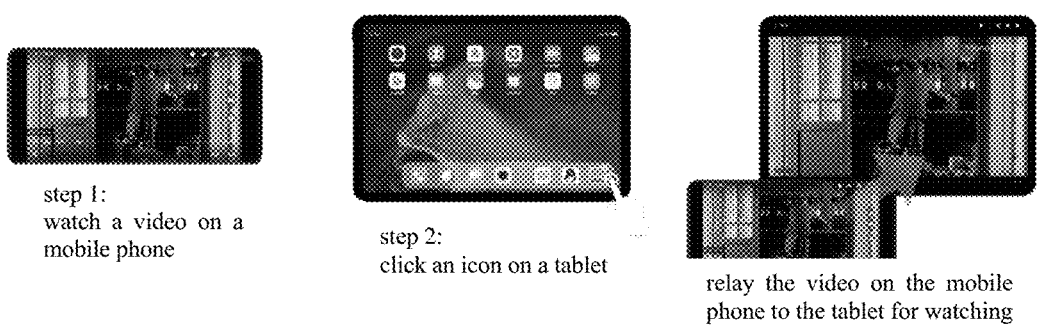
FIG. 11 is a schematic diagram of a process for synchronizing a video played on a mobile phone to a tablet computer.

In one example, a user unlocks a screen of a mobile phone and runs a certain video application to watch a video. An icon of the video being watched on the mobile phone will appear on a PAD. After the icon is clicked, the video that is being played on the mobile phone can continue to be watched on the PAD. A schematic diagram of the above process is shown in FIG. 11.

Figure 12:
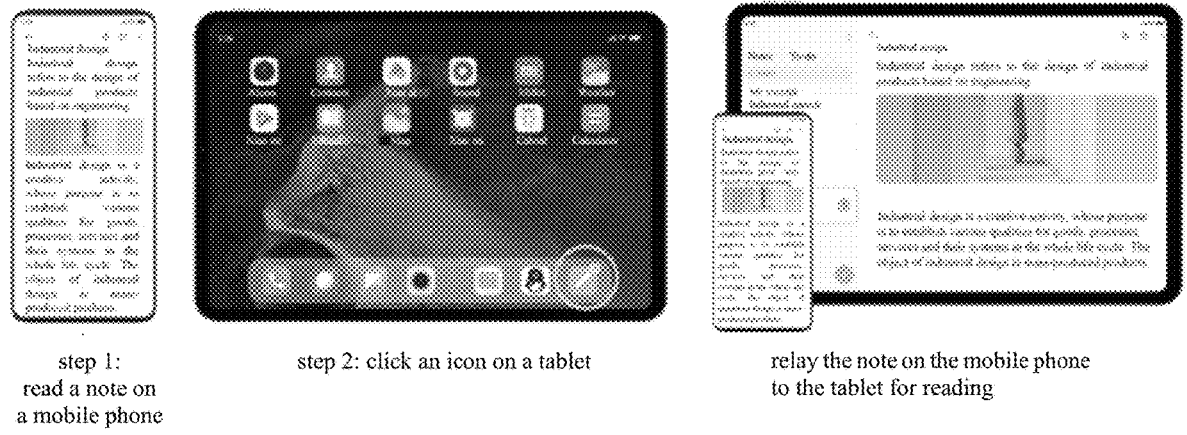
FIG. 12 is a schematic diagram of a process for synchronizing a note displayed on a mobile phone to a tablet computer.

In one example, a user unlocks a screen of a mobile phone and runs a note application to read a note. An icon of the note being read on the mobile phone will appear on a PAD. After the icon is clicked, the note being displayed on the mobile phone can continue to be read on the PAD. A schematic diagram of the above process is shown in FIG. 12.

In one example, a user unlocks a screen of a mobile phone and runs an email application to read an email. An icon of the email being read on the mobile phone will appear on a PAD. After the icon is clicked, the email being displayed on the mobile phone can continue to be read on the PAD.

In one example, a user unlocks a screen of a mobile phone and runs a Word application to read a document. An icon of the document being read on the mobile phone will appear on a PAD. After the icon is clicked, the document being displayed on the mobile phone can continue to be read on the PAD.

In one example, a user unlocks a screen of a mobile phone and runs a certain browser to browse a website. An icon of the browser being browsed on the mobile phone will appear on a PAD. After the icon is clicked, the website being browsed on the mobile phone can continue to be viewed on the PAD.

In an embodiment of the present disclosure, the second terminal establishes the communication connection with the first terminal, and performs the device login according to the device login information used by the first terminal. The application identification and the running status data of the target application sent by the first terminal associated with the second terminal are received. The icon of the target application is displayed in the target display area of the second terminal according to the application identification of the target application. The second terminal starts the target application and runs the target application according to the running status data in response to monitoring the start instruction to start the target application, and the shutdown indication is fed back to the first terminal, in which the shutdown indication is used to instruct the first terminal to shut down the target application. Embodiments of the present disclosure illustrate the synchronization process of the second terminal in a practical application scenario, and in particular illustrate that the second terminal feeds back the shutdown indication to the first terminal after the application synchronization is successful, so that the first terminal can automatically shut down the current application after the application synchronization is successful and resume free use, thus saving energy consumption of the first terminal and improving user experience.

Figure 13:
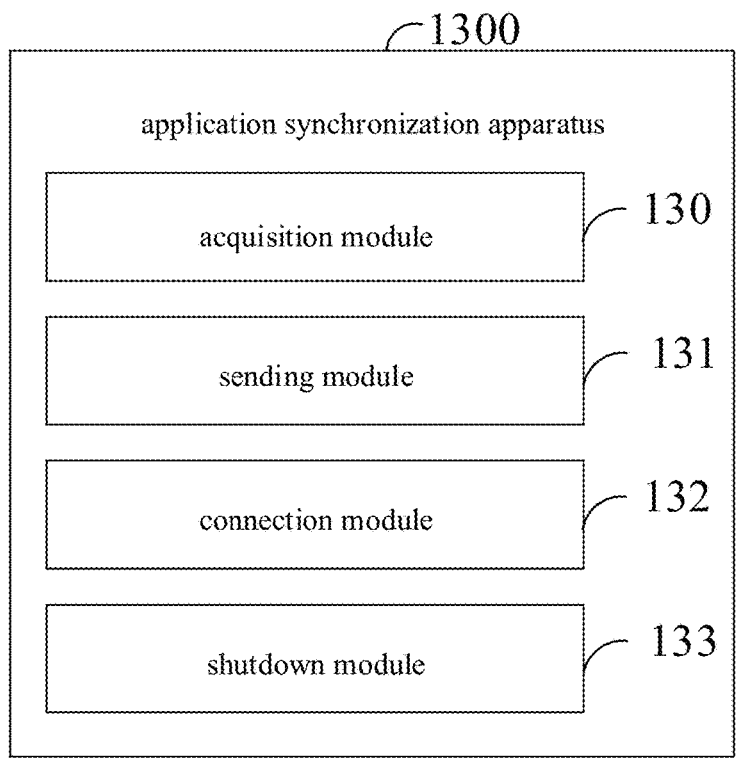
FIG. 13 is a schematic diagram of an application synchronization apparatus according to an embodiment of the present disclosure.

FIG. 13 is a schematic diagram of an application synchronization apparatus according to an embodiment of the present disclosure. As shown in FIG. 13, the application synchronization apparatus is applied to a first terminal, and the application synchronization apparatus 1300 includes an acquisition module 130 configured to obtain an application identification and running status data of a currently running target application, and a sending module 131 configured to send the application identification and the running status data to a second terminal associated with the first terminal, so to synchronize the target application on the second terminal with the target application on the first terminal.

In the embodiment of the present disclosure, it is possible to realize application relay between a mobile phone and a tablet, help a user to switch devices with one key, and automatically locate the application progress to continue using the application, thus greatly improving the efficiency and experience of the user.

It can be noted that the aforementioned explanation of the embodiment of the application synchronization method also applies to the application synchronization apparatus in the embodiment, which will not be elaborated herein.

Further, in a possible implementation of an embodiment of the present disclosure, the application synchronization apparatus 1300 further includes a connection module 132 configured to establish a communication connection with the second terminal, and perform a device login according to device login information used by the second terminal.

Further, in a possible implementation of an embodiment of the present disclosure, the running status data includes a resource identification and a resource display progress of a target resource currently displayed by the target application.

Further, in a possible implementation of an embodiment of the present disclosure, the application synchronization apparatus 1300 further includes a shutdown module 133 configured to shut down the target application after a preset period of time; or shut down the target application after receiving a shutdown indication fed back by the second terminal; or stop the target application and display a synchronization indication indicating that the target application has been synchronized to the second terminal, and shut down the target application in response to monitoring a shutdown operation.

Figure 14:
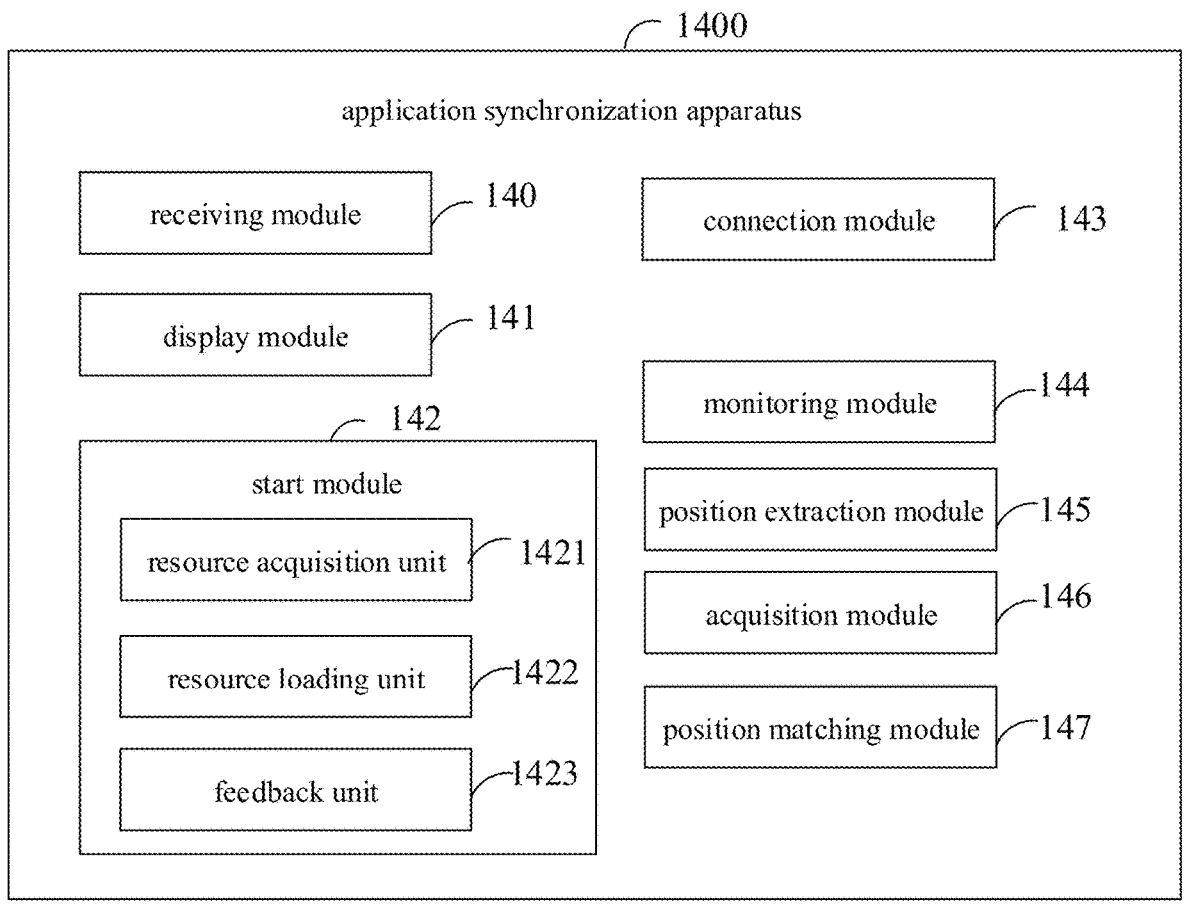
FIG. 14 is a schematic diagram of an application synchronization apparatus according to an embodiment of the present disclosure.

FIG. 14 is a schematic diagram of an application synchronization apparatus according to an embodiment of the present disclosure. As shown in FIG. 14, the application synchronization apparatus is applied to a second terminal, and the application synchronization apparatus 1400 includes a receiving module 140 configured to receive an application identification and running status data of a target application sent by a first terminal associated with the second terminal, in which the target application is an application currently running on the first terminal; a display module 141 configured to display an icon of the target application in a target display area of the second terminal according to the application identification of the target application; and a start module 142 configured to start the target application and run the target application according to the running status data in response to monitoring a start instruction to start the target application.

In the embodiment of the present disclosure, it is possible to realize application relay between a mobile phone and a tablet, help a user to switch devices with one key, and automatically locate the application progress to continue using the application, thus greatly improving the efficiency and experience of the user.

It can be noted that the aforementioned explanation of the embodiment of the application synchronization method also applies to the application synchronization apparatus in the embodiment, which will not be elaborated herein.

Further, in a possible implementation of an embodiment of the present disclosure, the application synchronization apparatus 1400 further includes a connection module 143 configured to establish a communication connection with the first terminal and perform a device login according to device login information used by the first terminal.

Further, in a possible implementation of an embodiment of the present disclosure, the running status data includes a resource identification and a resource display progress of a target resource currently displayed by the target application. The start module 142 further includes a resource acquisition unit 1421 configured to acquire the target resource according to the resource identification, and a resource loading unit 1422 configured to load a non-displayed content of the target resource into the started target application according to the resource display progress.

Further, in a possible implementation of an embodiment of the present disclosure, the resource loading unit 1422 is further configured to determine a display succession position of the target resource according to a resource volume of the target resource and the resource display progress, and load the non-displayed content of the target resource into the started target application from the display succession position.

Further, in a possible implementation of an embodiment of the present disclosure, the resource loading unit 1422 is further configured to load the non-displayed content of the target resource into the started target application from a next moment of a current display moment, in response to the resource display progress being the current display moment.

Further, in a possible implementation of an embodiment of the present disclosure, the resource acquisition unit 1421 is further configured to determine whether the target resource is stored on the second terminal according to the resource identification; and send a request to a resource server according to the resource identification and receive the target resource fed back by the resource server, in response to determining that the target resource is not stored on the second terminal.

Further, in a possible implementation of an embodiment of the present disclosure, the resource acquisition unit 1421 is further configured to extract the target resource from a local resource pool in response to the target resource being stored on the second terminal.

Further, in a possible implementation of an embodiment of the present disclosure, the start module 142 further includes a feedback unit 1423 configured to feed back a shutdown indication to the first terminal, in which the shutdown indication is used to instruct the first terminal to shut down the target application.

Further, in a possible implementation of an embodiment of the present disclosure, the application synchronization apparatus 1400 further includes a monitoring module 144 configured to monitor a user interaction operation within the target display area; a position extraction module 145 configured to extract an operation position from the user interaction operation in response to the user interaction operation monitored; an acquisition module 146 configured to acquire a display position of the icon in the target display area; and a position matching module 147 configured to determine that the start instruction is monitored, in response to matching between the operation position and the display position.

According to an embodiment of the present disclosure, there are also provided an electronic device. The electronic device includes a processor, and a memory for storing an executable program code. The processor is configured to run a program corresponding to the executable program code by reading the executable program code to implement the method in the above embodiments.

According to an embodiment of the present disclosure, there are also provided a non-transitory computer readable storage medium, having stored therein computer programs that, when executed by a processor, cause the method in the above embodiments to be implemented.

According to an embodiment of the present disclosure, there are also provided a computer program product, including computer programs that, when executed by a processor, cause the method in the above embodiments to be implemented.

Figure 15:
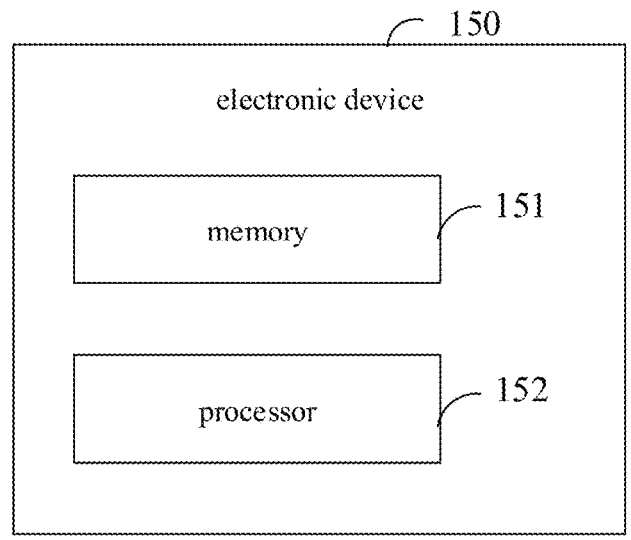
FIG. 15 is a block diagram of an electronic device used to implement an application synchronization method according to embodiments of the present disclosure.

FIG. 15 is a schematic block diagram showing an electronic device 150 that may be used to implement embodiments of the present disclosure. The electronic device is intended to represent various forms of digital computers, such as laptop computers, desktop computers, workstations, personal digital assistants, servers, blade servers, mainframe computers, and other suitable computers. The electronic device can also represent various forms of mobile devices, such as personal digital processors, cellular phones, smart phones, wearable devices, and other similar computing devices. The components shown herein, their connections and relationships, and their functions are merely intended as examples, and are not intended to limit implementations of the present disclosure described and/or claimed herein.

As shown in FIG. 15, the electronic device 150 includes a memory 151, a processor 152, and a computer program stored on the memory 151 and runnable on the processor 152. The computer program causes the aforementioned application synchronization method to be implemented when executed by the processor 152.

In one aspect, an application synchronization method is provided. The method is applied to a first terminal. The method includes acquiring an application identification and running status data of a currently running target application; and sending the application identification and the running status data to a second terminal associated with the first terminal to synchronize the target application on the second terminal with the target application on the first terminal.

In some embodiments, before sending the application identification and the running status data to the second terminal associated with the first terminal, the method further includes establishing a communication connection with the second terminal; and performing a device login according to device login information used by the second terminal.

In some embodiments, the running status data includes a resource identification and a resource display progress of a target resource currently displayed by the target application.

In some embodiments, after sending the application identification and the running status data to the second terminal associated with the first terminal, the method further includes shutting down the target application after a preset period of time; or shutting down the target application after receiving a shutdown indication fed back by the second terminal; or stopping the target application and displaying a synchronization indication indicating that the target application has been synchronized to the second terminal, and shutting down the target application in response to monitoring a shutdown operation.

In another aspect, an application synchronization method is provided. The method is applied to a second terminal. The method includes receiving an application identification and running status data of a target application sent by a first terminal associated with the second terminal, in which the target application is an application currently running on the first terminal; displaying an icon of the target application in a target display area of the second terminal according to the application identification of the target application; and starting the target application and running the target application according to the running status data in response to monitoring a start instruction to start the target application.

In some embodiments, before receiving the application identification of the target application and running status data of the target application sent by the first terminal associated with the second terminal, the method further includes establishing a communication connection with the first terminal; and performing a device login according to device login information used by the first terminal.

In some embodiments, the running status data includes a resource identification and a resource display progress of a target resource currently displayed by the target application, in which running the target application according to the running status data includes: acquiring the target resource according to the resource identification; and loading a non-displayed content of the target resource into the started target application according to the resource display progress.

In some embodiments, loading the non-displayed content of the target resource into the started target application according to the resource display progress includes determining a display succession position of the target resource according to a resource volume of the target resource and the resource display progress; and loading the non-displayed content of the target resource into the started target application from the display succession position.

In some embodiments, loading the non-displayed content of the target resource into the started target application according to the resource display progress includes loading the non-displayed content of the target resource into the started target application from a next moment of a current display moment, in response to the resource display progress being the current display moment.

In some embodiments, acquiring the target resource according to the resource identification includes: determining whether the target resource is stored on the second terminal according to the resource identification; and sending a request to a resource server according to the resource identification and receiving the target resource fed back by the resource server, in response to determining that the target resource is not stored on the second terminal.

In some embodiments, the method further includes extracting the target resource from a local resource pool in response to the target resource being stored on the second terminal.

In some embodiments, after starting the target application and running the target application according to the running status data, the method further includes feeding back a shutdown indication to the first terminal, in which the shutdown indication is used to instruct the first terminal to shut down the target application.

In some embodiments, the method further includes monitoring a user interaction operation within the target display area; extracting an operation position from the user interaction operation in response to the user interaction operation monitored; acquiring a display position of the icon in the target display area; and determining that the start instruction is monitored, in response to matching between the operation position and the display position.

In another aspect, an application synchronization apparatus is provided. The apparatus is applied to a first terminal. The apparatus includes an acquisition module configured to obtain an application identification and running status data of a currently running target application; and a sending module configured to send the application identification and the running status data to a second terminal associated with the first terminal, so to synchronize the target application on the second terminal with the target application on the first terminal.

In some embodiments, the apparatus further includes a connection module configured to establish a communication connection with the second terminal, and perform a device login according to device login information used by the second terminal.

In some embodiments, the running status data includes a resource identification and a resource display progress of a target resource currently displayed by the target application.

In some embodiments, the apparatus further includes a shutdown module configured to shut down the target application after a preset period of time; or shut down the target application after receiving a shutdown indication fed back by the second terminal; or stop the target application and display a synchronization indication indicating that the target application has been synchronized to the second terminal, and shut down the target application in response to monitoring a shutdown operation.

In another aspect, an application synchronization apparatus is provided. The apparatus is applied to a second terminal. The apparatus includes a receiving module configured to receive an application identification and running status data of a target application sent by a first terminal associated with the second terminal, in which the target application is an application currently running on the first terminal; a display module configured to display an icon of the target application in a target display area of the second terminal according to the application identification of the target application; and a start module configured to start the target application and run the target application according to the running status data in response to monitoring a start instruction to start the target application.

In some embodiments, the apparatus further includes a connection module configured to establish a communication connection with the first terminal and perform a device login according to device login information used by the first terminal.

In some embodiments, the running status data includes a resource identification and a resource display progress of a target resource currently displayed by the target application, in which the start module includes a resource acquisition unit configured to acquire the target resource according to the resource identification, and a resource loading unit configured to load a non-displayed content of the target resource into the started target application according to the resource display progress.

In some embodiments, the resource loading unit is further configured to determine a display succession position of the target resource according to a resource volume of the target resource and the resource display progress, and load the non-displayed content of the target resource into the started target application from the display succession position.

In some embodiments, the resource loading unit is further configured to load the non-displayed content of the target resource into the started target application from a next moment of a current display moment, in response to the resource display progress being the current display moment.

In some embodiments, the resource acquisition unit is further configured to determine whether the target resource is stored on the second terminal according to the resource identification; and send a request to a resource server according to the resource identification and receive the target resource fed back by the resource server, in response to determining that the target resource is not stored on the second terminal.

In some embodiments, the resource acquisition unit is further configured to extract the target resource from a local resource pool in response to the target resource being stored on the second terminal.

In some embodiments, the start module includes a feedback unit configured to feed back a shutdown indication to the first terminal, in which the shutdown indication is used to instruct the first terminal to shut down the target application.

In some embodiments, the apparatus further includes a monitoring module configured to monitor a user interaction operation within the target display area; a position extraction module configured to extract an operation position from the user interaction operation in response to the user interaction operation monitored; an acquisition module configured to acquire a display position of the icon in the target display area; and a position matching module configured to determine that the start instruction is monitored, in response to matching between the operation position and the display position.

In another aspect, an electronic device is provided. The electronic device includes a processor, and a memory for storing an executable program code. The processor is configured to run a program corresponding to the executable program code by reading the executable program code to implement the abovementioned method.

In another aspect, a non-transitory computer readable storage medium is provided, having stored therein computer programs that, when executed by a processor, cause the abovementioned method to be implemented.

In another aspect, a computer program product is provided, including computer programs that, when executed by a processor, cause the abovementioned method to be implemented.

In addition, terms "first" and "second" are merely used for purposes of description, but cannot be construed as indicating or implying relative importance or implicitly specifying the number of technical features indicated. Thus, the feature defined with "first" and "second" may explicitly or implicitly include one or more of such a feature. In the description of the present disclosure, "a plurality of" means two or more, unless otherwise expressly and specifically limited.

Reference throughout this specification to terms "an embodiment," "some embodiments," "an example," "a specific example," or "some examples", etc., means that a particular feature, structure, material, or characteristic described in connection with the embodiment or example is included in at least one embodiment or example of the present disclosure. Schematic expressions of the above terms throughout this specification are not necessarily referring to the same embodiment or example. Furthermore, the particular features, structures, materials, or characteristics described may be combined in any suitable manner in one or more embodiments or examples. In addition, those skilled in the art can combine the different embodiments or examples and the features of the different embodiments or examples described in this specification without being mutually inconsistent.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Although embodiments of the present disclosure have been shown and described above, it is appreciated that the above embodiments are illustrative and cannot be construed to limit the present disclosure, and variations, modifications, replacements and variants of the above embodiments can be made by those skilled in the art within the scope of the present disclosure.

What is claimed is:

1. An application synchronization method, comprising:
receiving, by a second terminal, an application identification and running status data of a target application sent by a first terminal associated with the second terminal, wherein the target application is an application currently running on the first terminal, wherein the running status data comprises a resource identification and a resource display progress of a target resource currently displayed by the target application;
displaying, by the second terminal, an icon of the target application in a target display area of the second terminal according to the application identification of the target application; and
starting, by the second terminal, the target application and running, by the second terminal, the target application according to the running status data in response to monitoring a start instruction to start the target application.

2. The method of claim 1, further comprising:
establishing, by the second terminal, a communication connection with the first terminal; and
performing, by the second terminal, a device login according to device login information used by the first terminal.

3. The method of claim 1, wherein the running status data comprises a resource identification and a resource display progress of a target resource currently displayed by the target application, wherein running the target application according to the running status data comprises:
acquiring the target resource according to the resource identification; and
loading a non-displayed content of the target resource into the started target application according to the resource display progress.

4. The method of claim 3, wherein loading the non-displayed content of the target resource into the started target application according to the resource display progress comprises:
determining a display succession position of the target resource according to a resource volume of the target resource and the resource display progress; and
loading the non-displayed content of the target resource into the started target application from the display succession position.

5. The method of claim 3, wherein loading the non-displayed content of the target resource into the started target application according to the resource display progress comprises:
loading the non-displayed content of the target resource into the started target application from a next moment of a current display moment, in response to determining that the resource display progress is the current display moment.

6. The method of claim 3, wherein acquiring the target resource according to the resource identification comprises:
determining whether the target resource is stored on the second terminal according to the resource identification; and
sending a request to a resource server according to the resource identification and receiving the target resource fed back by the resource server, in response to determining that the target resource is not stored on the second terminal.

7. The method of claim 6, further comprising:
extracting, by the second terminal, the target resource from a local resource pool in response to the target resource being stored on the second terminal.

8. The method of claim 1, further comprising:
feeding back, by the second terminal, a shutdown indication to the first terminal, wherein the shutdown indication is used to instruct the first terminal to shut down the target application.

9. The method of claim 1, further comprising:
monitoring, by the second terminal, a user interaction operation within the target display area;
extracting, by the second terminal, an operation position from the user interaction operation in response to the user interaction operation monitored;
acquiring, by the second terminal, a display position of the icon in the target display area; and
determining that the start instruction is monitored, in response to determining that the operation position matches the display position.

10. An electronic device, comprising:
a processor; and
a memory for storing an executable program code;
wherein the processor is configured to perform the method of claim 1.

11. The electronic device of claim 10, wherein the processor is further configured to:
establish a communication connection with the first terminal; and
perform a device login according to device login information used by the first terminal.

12. The electronic device of claim 10, wherein the running status data comprises a resource identification and a resource display progress of a target resource currently displayed by the target application,
the processor is further configured to:
acquire the target resource according to the resource identification; and
load a non-displayed content of the target resource into the started target application according to the resource display progress.

* * * * *